June 2, 1931. W. GEBHARDT 1,808,104
NUT GRADING MACHINE
Filed Dec. 17, 1928 4 Sheets-Sheet 1

INVENTOR
William Gebhardt,
BY
ATTORNEYS

June 2, 1931. W. GEBHARDT 1,808,104
NUT GRADING MACHINE
Filed Dec. 17, 1928 4 Sheets-Sheet 2

June 2, 1931.  W. GEBHARDT  1,808,104
NUT GRADING MACHINE
Filed Dec. 17, 1928  4 Sheets-Sheet 3

INVENTOR
William Gebhardt,
BY
ATTORNEYS

June 2, 1931.   W. GEBHARDT   1,808,104
NUT GRADING MACHINE
Filed Dec. 17, 1928   4 Sheets-Sheet 4

INVENTOR
William Gebhardt,
BY
ATTORNEYS

Patented June 2, 1931

1,808,104

UNITED STATES PATENT OFFICE

WILLIAM GEBHARDT, OF SAN ANTONIO, TEXAS, ASSIGNOR TO G. A. DUERLER MANUFACTURING COMPANY, OF SAN ANTONIO, TEXAS, A CORPORATION OF TEXAS

NUT GRADING MACHINE

Application filed December 17, 1928. Serial No. 326,630.

This invention relates to nut grading machines and, among other objects, aims to provide an improved apparatus for grading pecans and the like according to their lengths, so that nuts having meats of practically uniform sizes and lengths are separated from the rest.

In the accompanying drawings.

Figure 1:
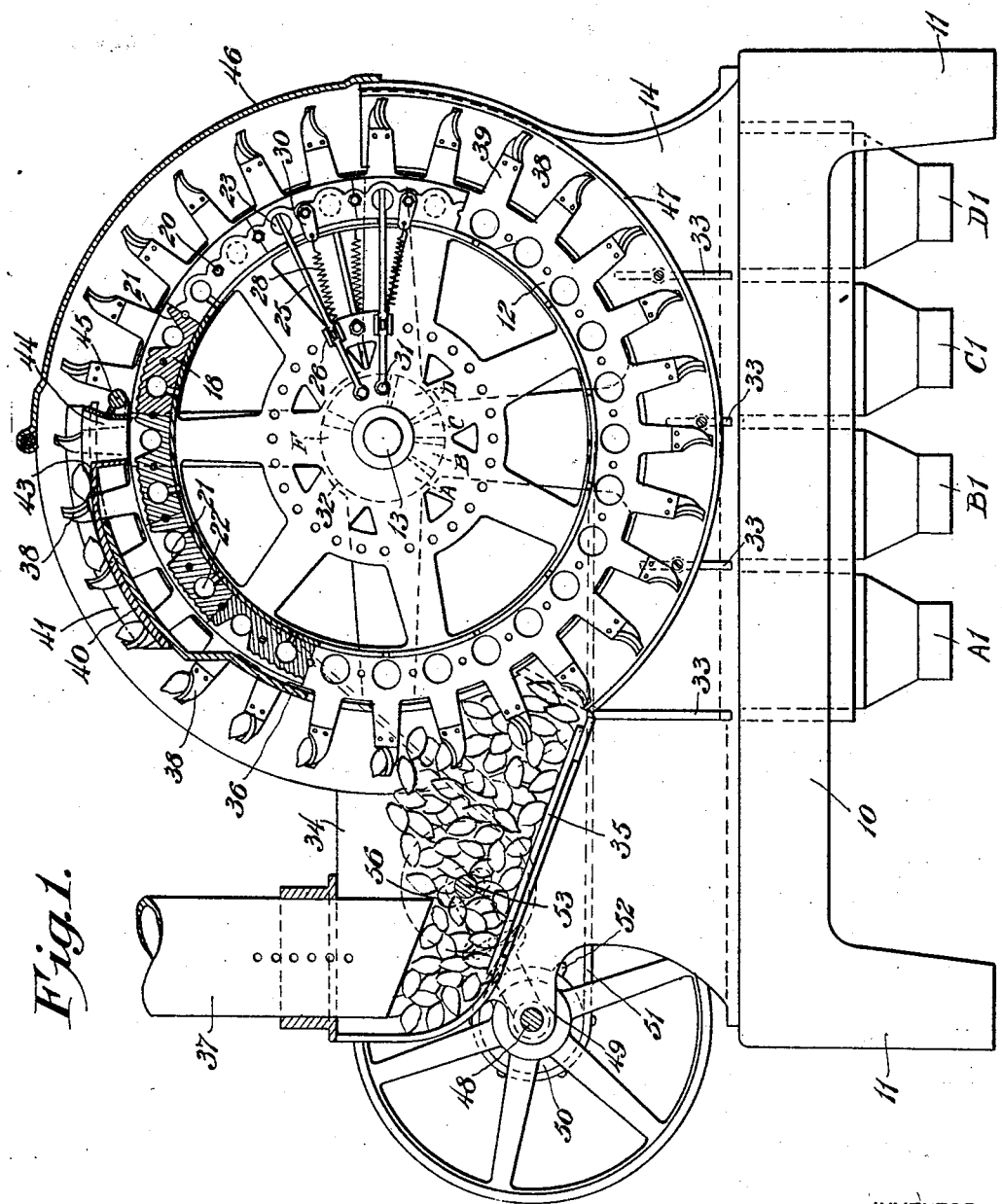
Fig. 1 is a side elevation of the preferred machine, parts being broken away and other parts being shown in section.

Heretofore, pecans have been graded according to their diameters only and the most common type of machine now employed for this purpose is a rotary screen or sieve. The nuts are usually separated into three or more numbered grades and the largest ones command the best price. For commercial purposes, as in the candy industry, the nuts are usually cracked in automatic machines in which the individual nuts are first gripped and then cracked endwise by cam operated plungers. It is desirable that the nuts shall be gripped with substantially uniform pressure and that they shall be of the same lengths in order that they may be fractured uniformly in some types of cracking machines. Moreover, the longer the nuts the larger are the meats and the long meats command top prices.

It is therefore an important aim of this invention to provide an improved automatic machine for grading the nuts strictly according to their lengths, whether or not they have been previously graded according to their diameters. However, nuts graded according to diameters and lengths command very fancy prices.

Referring to the preferred embodiment of the invention illustrated in the drawings, the machine there shown includes generally a movable carrier which has a series of elongated pockets into which individual nuts are fed endwise as the carrier moves and, immediately after the pockets move past their respective filling stations, mechanically operated grippers clamp them endwise and hold them until they pass over a series of chutes arranged in succession under the carrier. Then the grippers are actuated above the different chutes according to the lengths of the nuts to release the nuts so that they will fall into their respective chutes.

More specifically describing the selected embodiment of the invention and, for the present only one unit thereof, duplex units being preferred, there is shown a suitable base 10 supported above the floor on legs 11 and the main carrier, in the form of a wheel 12 having integral stub shafts 13, is journaled in the sides of the sectional casing members 14 which are conveniently bolted on opposite sides of the wheel. Both of the wheel casings are preferably, though not necessarily, mounted on the same base and one stub shaft of each wheel is adapted to be driven by a common pulley 15.

Figure 4:
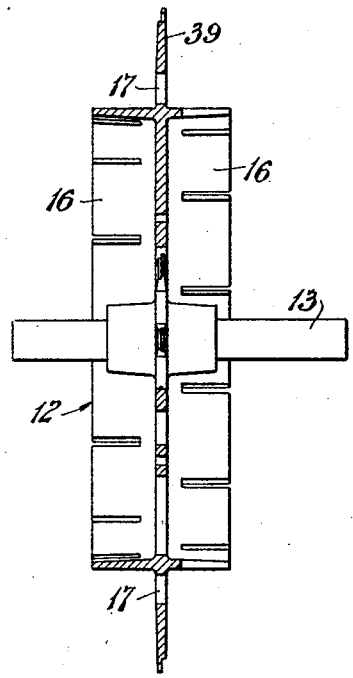
Fig. 4 is a central sectional view of the rotary carrier wheel stripped of its mechanism.
Figure 5:
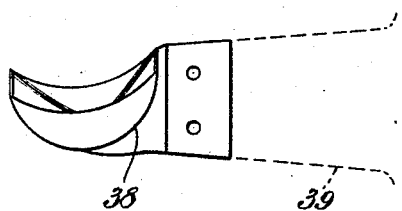
Fig. 5 is a side elevation of one of the nut feeding devices.
Figure 6:
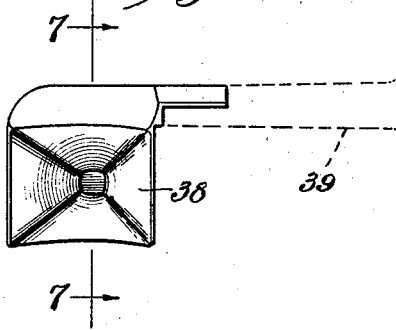
Fig. 6 is a top plan view of the feeding device.
Figure 8:
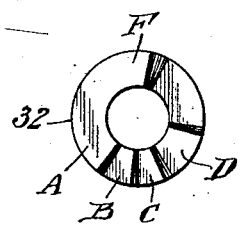
Fig. 8 is a face view of one of the ring cams used in the machine.
Figure 7:
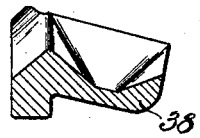
Fig. 7 is a sectional view taken on the line 7—7 of Fig. 6.

The carrier wheel 12, best shown in Fig. 4, is conveniently made of cast brass or bronze and has transversely slotted or grooved cylindrical flanges 16 adjacent to the periphery, the web extending beyond the flanges and having a circular series of holes 17 in which the nut gripper members are secured.

To provide pockets and guides for the nut grippers a series of similar segmental blocks 18, preferably made of "bakelite" or some other die cast and highly finished material, are secured against opposite sides of the wheel web and rest against the outer periphery of the flanges 16. These blocks have hollow bosses or projections 19 inserted in the respective openings and also present aligned openings through which clamping bolts 20 are passed to clamp them detachably to the wheel. A pocket 21 is formed in a block on one side of an opening or hole 17 and a plunger guide 22 is formed in the block on the opposite side of the hole, and the arrangement is such that the pockets and the guides alternate on each side of the web; that is to say, the pockets and guides are staggered as viewed on both sides, a pocket being on one side and the next pocket being on the other side.

Figure 3:
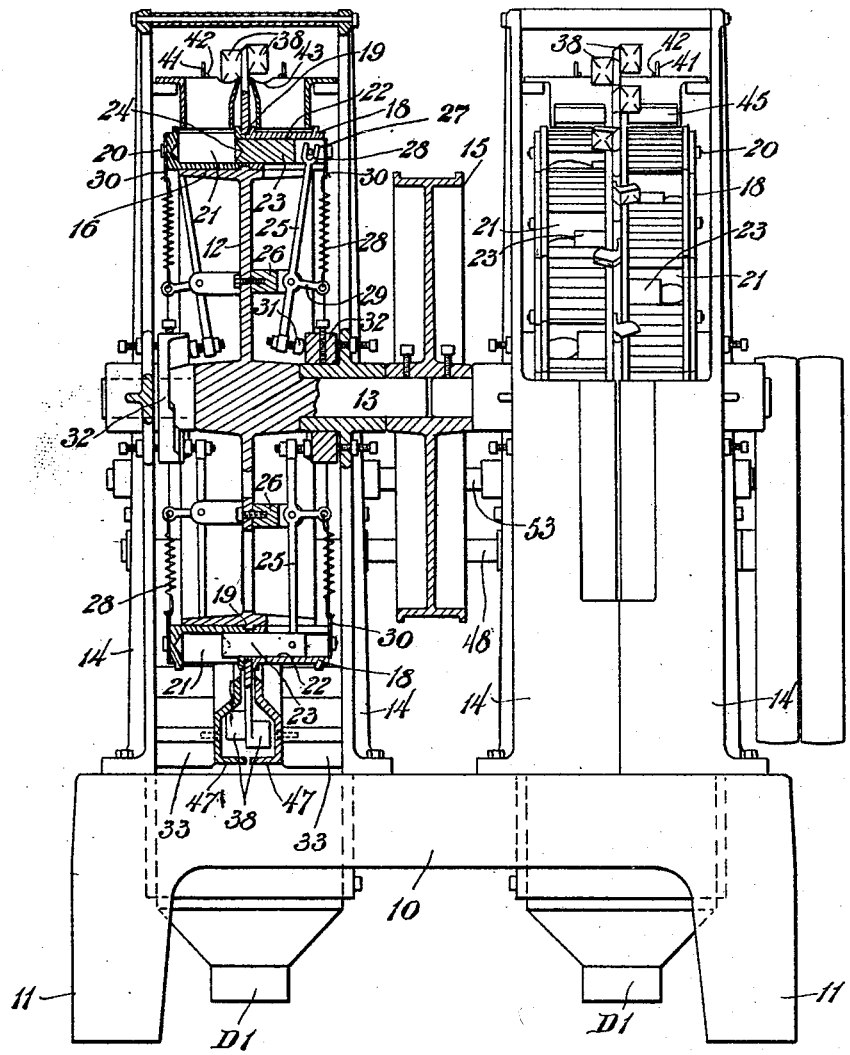
Fig. 3 is a front elevation of the duplex machine, one unit also being shown in vertical section.

Within the guides are cylindrical gripping plungers 23, also preferably made of "bakelite," and these plungers have conical recesses 24 at their gripping ends to receive the ends of the nuts and center them properly. The opposite end walls of the pockets have corresponding conical recesses likewise to receive the opposite ends of the nuts. To provide actuating means for the grippers, the outer ends of the plungers 23 are slotted as shown in Figs 1 and 3, and have pins passing through the slots. A series of radial gripping levers or arms 25, are pivotally connected to forked or slotted lugs 26 secured by screws or the like, to the spider of the wheel 12 and these levers have forked ends 27 engaging the pins (see Fig. 3). Tension springs 28 are each connected at one end to bell crank arms 29 on the levers, and at the other end to a washer 30 on the wheel, normally to press the plungers inwardly to clamp the nuts. Each lever works in one of the slots in the flanges 16 and a slot through the bottom of the guide block.

Figure 9:
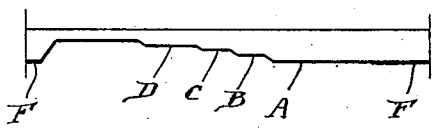
Fig. 9 is a developed view of the cam contour.

The inner ends of the levers have adjustable cam-engaging knobs 31 in the form of round headed bolts screwed into the levers and projecting laterally therefrom and these knobs or heads are held in adjusted positions by suitable lock nuts and co-operate with ring-shaped multiple-throw cams 32 adjustably mounted by set screws on the wheel shaft housings or bearings at the sides. Herein, the cams have cam surfaces F, A, B, C and D, (see Fig. 9), each arranged to coact with the levers at definite stations or in timed relation. For the present, it will suffice to state that cam face F trips a lever to open a gripper when the nut pocket reaches the filling station and a nut is dropped into the open pocket and caused to lie endwise therein by means later to be described. Then, the cam frees the gripper lever so that its spring will cause it to clamp the nut. The nuts are thus supplied and gripped in succession.

The cam surfaces or faces A, B, C and D on the cam rings are arranged in successively higher steps so that they will actuate the levers at different stations during their rotation, the highest step being A because it acts to release the grippers holding the longest nuts or grade "A" nuts and so on down to grade "C" or as many different grades as desired.

In the present example, the releasing stations for the different grade nuts are at the lower part of the wheel and the casing sections have integral transverse portions 33 to form guideways for the nuts. Below each guideway in the base 10 of the machine are a series of receivers or chutes A1, B1, C1, and D1. These chutes are secured to guide the nuts into bags or to separate storage bins. The chutes are thus designated because of the grades of nuts which they receive. Now, the shortest nuts are released first by the lowest cam faces D on each side of the wheel and they fall out of their pockets before the pockets pass over the first partition 33 shown at the right in Fig. 1. This happens because the cam engaging knob ends of the levers gripping the shortest nuts project outwardly farther than the ends of those gripping the longer nuts, and thus come in the path of the lowest steps on the respective cams. Those levers gripping the longer nuts, grades C, B, and A will clear the lowest steps.

The grippers may be adjusted by changing the settings of the cams or the knobs to grade batches of nuts of any of the usual commercial grades. For example, if very long nuts are to be graded the cam rings 32 can be moved inwardly by means of the set screws or the cam engaging knobs 31 can be made longer by unscrewing the knob bolts.

Figure 2:
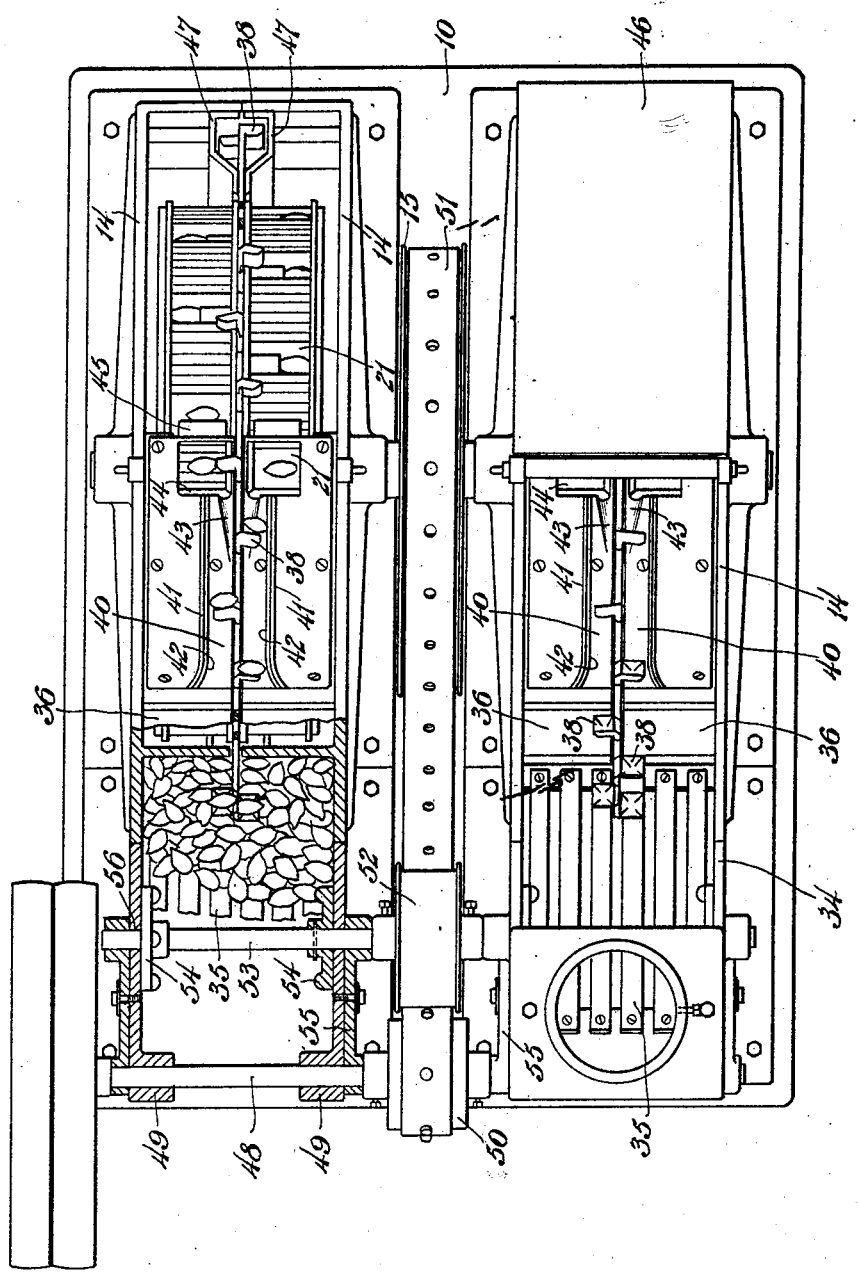
Fig. 2 is a top plan view of a duplex machine, one unit being shown partly in section.

Now, to supply nuts to the machine, a hopper 34, conveniently made in sections, is secured to the base 10 adjacent to the rear end of the casing 14 and has an openwork, inclined bottom 35 to permit foreign matter, such as small stones, dirt and broken shells, to escape. The lower end of the hopper is separated from the blocks and pockets on the wheel by arcuate partitions 36 on the sides of the casing 14 (Figs. 1 and 2). A nut chute 37 is adjustably mounted in the hopper and is preferably shaped, as shown in Fig. 1, to prevent nuts from overflowing the hopper and to maintain them at the proper feeding level.

To feed nuts, one at a time, to the gripper pockets in the wheel, the wheel is shown as having pick-up, substantially cup-shaped spoons 38 carried by radial arms 39 projecting from the middle of the wheel, the spoons projecting laterally and slightly rearwardly on opposite sides of the arms alternately. The spoons are spaced from the partitions 36 to prevent jamming of the nuts against them and the arms work in the space between the partitions. The shape of the spoons and of the front edges of the arms are such as to pass through the hopper, as shown in Fig. 1, and pick up a single nut at a time, and the extra nuts or doubles will fall back.

As the pick-up spoons approach a vertical position, the nuts will, of course, spill out. As shown in Figs. 1 and 2, arcuate guide plates 40 are secured to the respective arcuate portions 36, the latter being raised for this purpose. Each guide plate lies directly under the path of the spoons so that the nuts cannot jam between them and the spoons or fall back. At the outer edges of the guides are vertical nut guiding flanges 41 preferably cast integral with them to prevent the nuts from falling off the guide plates at the sides. The slight rearward inclination of the spoons will cause the nuts to hug against and slide along the plates against these flanges. At the junctions of the flanges with the plates are rounded fillet members 42 which may be provided by soldering or brazing on pieces of wire or tubing. This prevents the nuts from jamming between the outer edges of the spoons and the corners.

The upper or forward ends of the guide plates 40 near the tops have forwardly flaring troughs 43 (see Figs. 1 and 2) so that the nuts are guided to fall into open chutes 44, also conveniently cast integral with the plates and leading to the path of the nut pockets at the filling station. The arrangement is such that a nut will fall on the roughened or corrugated surfaces of the segmental blocks between the pockets just prior to the time when the respective receiving pockets pass the bottoms of the chutes, these surfaces acting to straighten out the nuts lengthwise when they strike the forward wall of the chute ready to roll into the pockets.

To seat the nuts in the bottoms of the pockets, the forward walls of the hoppers have weighted, hinged flaps or trap doors 45 suspended vertically over the paths of the pockets (Fig. 1). The flaps cause the nuts as they pass under them to be seated in the pockets ready to be gripped as hereinbefore described. Also they will permit any nut standing on its end to pass under them without jamming the machine.

The empty spoons, after they pass the chutes, are protected by a hinged cover plate 46 (Fig. 1) which may be raised for inspection purposes and to make repairs. As the spoons pass under the nut discharging stations at the lower part of the casing, they are prevented from striking the falling nuts by a segmental annular housing 47 conveniently shaped as shown in section in Fig. 3 so that the nuts will fall on either side of it. Also, this housing is made in sections suitably secured to the main casing sections 14 by means of screws or the like. The housing opens into the bottom of the hopper 34 so that the spoons emerge from it into the nuts. The nuts cannot fall into the housing and clog it up or jam the spoons.

As hereinbefore stated, two such machines are preferably mounted on the same base, this number being selected because it is sometimes necessary to stop either or both units for repairs and the outside sections of the casings can be removed for easy access to operating mechanisms. Obviously several more machines can be mounted side by side but they should be spaced farther apart for easy access and should have separate driving connections.

Herein, the duplex machine is adapted to be driven from a countershaft 48 conveniently journaled in ears 49 on the hopper casing. This shaft has a driving pulley 50 between the hoppers aligned with the flanged wheel pulley 15. A suitable drive belt 51 having a row of perforations to cooperate with radial pins on the pulley 50 is trained over the pulleys, the idea being to prevent the belt from slipping on the small driving pulley due to the relatively large power transmitted. It is desirable to permit the belt to slip on the pulley 15 when the machine becomes choked or clogged, and thus prevent breakage of parts.

To provide a belt tightener, an idle pulley 52 is shown as being mounted on a shaft 53 which also carries knobbed disk stirrers 54 within the respective nut hoppers to keep the nuts stirred and thereby prevent the formation of large voids in the paths of the spoons. This shaft is carried by swinging arms 55 mounted on the countershaft and works up and down in slots 56 through the hopper walls behind the disk stirrers (Fig. 1), the disks closing the slots to prevent nuts from escaping.

Since the operation of the machine has been fully described in connection with the various parts, no further explanation is necessary. Machines of this type are capable of grading very large quantities of pecans. One duplex unit has a capacity of more than a ton per day and they have demonstrated that they will work very satisfactorily. They take the place of the laborious and expensive method of hand grading to pick out nut meats of substantially uniform lengths. The parts are easily assembled and may be quickly replaced. It is only necessary to disconnect one unit of a duplex machine to repair the damaged unit while the other unit may be kept in operation.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. A machine for grading pecans and the like according to their lengths comprising, in combination, a rotary carrier movable over a series of chutes in succession; spring-urged nut gripping devices arranged in staggered relation on opposite sides of the carrier and having pockets to receive the nuts lengthwise therein; means to supply nuts, one at a time to the pockets; means to hold the grippers open while the nuts are being supplied; and cam means cooperating with the grippers to release the nuts successively according to their grade sizes so that they will fall into the respective chutes.

2. A machine for grading pecans and the like according to their lengths comprising, in combination, a rotary carrier; a plurality of spring-urged nut grippers arranged in staggered relation on opposite sides of the carrier, the carrier presenting elongated nut pockets transversely of the carrier; nut feeding mechanism associated with the carrier and arranged to deposit nuts, one at a time, to be gripped lengthwise by the grippers; a series of chutes arranged in succession under the carrier; and a cam cooperating with the grippers to release the nuts successively according to their lengths as they pass over the respective chutes so they will fall into the chutes.

3. A machine for grading pecans and the like according to their lengths comprising, in combination, a rotary carrier wheel; a plurality of nut gripping members mounted on the wheel and having nut receiving pockets; pick-up spoons on the wheel arranged to feed single nuts to said pockets as the wheel rotates; a guide chute to receive the nuts and guide them to fall into the respective pockets; a hinged flap on the chute arranged to ride over the nuts and cause them to lie endwise in said pockets; bell crank arms pivotally mounted on the wheel and connected to the gripping members; a plurality of chutes under the wheel; and a fixed cam member cooperating with the bell crank members to open the gripping members first to receive the nuts and then to release the nuts in succession according to their lengths so that they will fall into the respective chutes.

4. A machine for grading pecans and the like according to their lengths comprising, in combination, a rotary carrier wheel; a plurality of nut gripping members mounted on the wheel and having nut receiving pockets; a nut hopper adjacent to the wheel carrier; pick-up spoons secured to the wheel carrier and passing through the hopper; a guide chute to receive the nuts from said spoons and guide them to drop into said pockets; a weighted, hinge flap in one wall of the guide chute under which the nuts move and arranged to cause them to lie endwise in the pockets; bell crank arms pivotally mounted on the wheel and connected to the gripping members; a plurality of chutes under the wheel; and a fixed cam member cooperating with the bell crank members to open the gripping members first to receive the nuts and then to release the nuts in succession according to their lengths so that they will fall into the respective chutes.

5. A machine for grading pecans and the like according to their lengths comprising, in combination, a casing; a carrier wheel journaled in the casing; segmental blocks secured to the wheel having aligned plunger guides and nut receiving pockets transversely of the wheel, the plunger guides and pockets being alternately arranged on opposite sides of the wheel; plungers in the plunger guides having recessed ends to grip the nuts endwise; the opposite end walls of the pockets also being recessed to receive the ends of the gripped nuts; radially mounted levers pivotally connected to opposite sides of the wheel and operatively connected to the plungers; springs connected to the levers to close the plungers; stationary cams coaxial with the wheels having one cam surface cooperating with the levers to open said plungers to receive the nuts; means to deliver nuts to the pockets partly by gravity when the plungers are held open; and a series of chutes arranged in succession under the wheel; and said cams having a corresponding series of stepped cam surfaces cooperating with the levers to open the plungers and release the nuts in the order of their lengths so that they will fall into the respective chutes.

6. A machine for grading pecans and the like according to their lengths comprising, in combination, a casing; a carrier wheel journaled in the casing; segmental blocks secured to the wheel having aligned plunger guides and nut receiving pockets transversely of the wheel, the plunger guides and pockets being alternately arranged on opposite sides of the wheel; plungers in the plunger guides having recessed ends to grip the nuts endwise; the opposite end walls of the pockets also having recesses to receive the ends of the gripped nuts; radially mounted levers pivotally connected to opposite sides of the wheels and operatively connected to the plungers; springs connected to the levers to close the plungers; stationary cams coaxial with the wheels having one cam surface cooperating with the levers to open said plungers to receive the nuts; nut feeding spoons secured to the wheel and having radial arms; nut guiding means cooperating with the spoons to deliver the nuts to the pockets; said blocks having roughened peripheral surfaces between the pockets to assist in guiding nuts endwise into the pockets; and a series of chutes arranged in succession under the wheel, said cams having a corresponding series of stepped cam surfaces cooperating with the levers to open the plungers and release the nuts in the order of their lengths so that they will fall into the respective chutes.

7. A machine for grading pecans and the like according to their lengths comprising, in combination, a casing; a carrier wheel journaled in the casing; segmental blocks secured to the wheel having aligned plunger guides and nut receiving pockets transversely of the wheel, the plunger guides and pockets being alternately arranged on opposite sides of the wheel; plungers in the plunger guides having recessed ends to grip the nuts endwise; the opposite end walls of the pockets also being recessed to receive the ends of the gripped nuts; radially mounted levers pivotally connected to opposite sides of the wheels and operatively connected to the plungers; springs connected to the levers to close the plungers; stationary cams coaxial with the wheels having one cam surface cooperating with the levers to open said plungers to receive the nuts; radial arms projecting from the periphery of the wheel, one for each pocket; pick-up, cup-shaped spoons alternately arranged on opposite sides of the arms to supply single nuts to the respective pockets; flanged segmental guide plates supported by the casing under each set of spoons to receive and guide the nuts as the spoons pass upwardly over the plates; a polished nut guiding chute associated with each plate to cause the nuts to fall into the respective pockets; nut guiding means cooperating with the spoons to deliver the nuts to the pockets; said blocks having roughened peripheral surfaces between the pockets to assist in guiding nuts endwise into the pockets; and a series of chutes arranged in succession under the wheel, said cams having a corresponding series of stepped cam surfaces cooperating with the levers to open the plungers and release the nuts in the order of their lengths so that they will fall into the respective chutes.

8. In a machine of the class described, a rotary carrier wheel having a circular series of transverse openings adjacent to the periphery; segmental blocks secured to the wheel on opposite sides and presenting abutting projections extending part way through the openings; flanges on the blocks abutting the sides of the wheel; clamping bolts passing through the blocks and through the wheel; the blocks on each side of the wheel having alternate plunger guides and nut receiving pockets around the wheel, each guide aligning with a pocket on the other side; nut gripping plungers in each of said guides; means to actuate the plungers to grip and then release the nuts in sequence according to their sizes; and chutes to receive the released nuts of different grade sizes.

9. A nut grading machine comprising, in combination, a carrier wheel having two rows of nut grippers around opposite sides of the periphery; spoons on the wheel to supply nuts to the grippers; means to open the grippers to receive the nuts endwise; means to release the gripped nuts at different times according to their lengths as the wheel revolves; a casing about the wheel having a segmental housing for the spoons below the zone where the nuts are released; partitions in the housing in the releasing zone to guide the nuts of different lengths to fall separately; and chutes below the partitions to receive the falling nuts.

10. A nut feeder for a machine of the class described comprising, in combination, a hopper having an openwork, inclined bottom to permit foreign matter to escape; an adjustable chute extending into the hopper to maintain the level of the nuts substantially constant; a rotary agitator within the hopper; a rotary wheel having radial arms; a series of cup-shaped spoons projecting laterally and at an angle to the arms and passing through the hopper and constructed and arranged to pick up only one nut at a time and permit extra nuts to fall back into the hopper; a segmental guide plate over which the spoons rotate; a side flange on the guide plate having a fillet member at the junction therewith to prevent the nuts from falling off sidewise; a chute to receive the nuts and deliver them to the machine; and a trough-shaped guideway in the periphery of the plate to cuase the nuts to fall into the chute.

11. In combination with a duplex nut grading machine of the class described, spaced nut hoppers adjacent to each unit; a countershaft behind the hoppers for driving the machine; a driving pulley on the countershaft between the hoppers; a driven pulley between the units aligned with the driving pulley; a driving belt on the pulleys; means positively to prevent the belt from slipping on the driving pulley; an idle pulley for the belt; an idle pulley shaft extending through both nut hoppers; pivoted arms mounted on the countershaft to support the idle pulley shaft; the hopper walls having slots in which the shaft swings up and down; and nut stirring devices within the hoppers closing the slots in the walls.

12. A duplex nut grading machine comprising, in combination, a pair of rotary wheels having nut grippers; a single driving pulley detachably connected to both wheels; mechanical means to open and close the grippers including mechanism acting on the grippers to open them in sequence according to the dimensions of the gripped nuts; separable casings for the separate wheels; nut hoppers secured to each casing; pick-up spoons on the wheels passing through the hoppers; and nut guiding means to receive the nuts from the spoons and guide them into the respective grippers.

In testimony, that I claim the foregoing as my own, I have hereto affixed my signature.

WILLIAM GEBHARDT.